United States Patent [19]

Suonvieri

[11] Patent Number: 5,715,245
[45] Date of Patent: Feb. 3, 1998

[54] DATA TRANSMISSION FROM A CONTROLLER TO SUCCESSIVE BASES STATIONS LINKED IN SERIES

[75] Inventor: Jukka Suonvieri, Oulu, Finland

[73] Assignee: Nokia Telecommunications OY, Espoo, Finland

[21] Appl. No.: 571,826

[22] PCT Filed: Jun. 16, 1994

[86] PCT No.: PCT/FI94/00268

§ 371 Date: May 22, 1996

§ 102(e) Date: May 22, 1996

[87] PCT Pub. No.: WO95/01015

PCT Pub. Date: Jan. 5, 1995

[30] Foreign Application Priority Data

Jun. 23, 1993 [FI] Finland ................ 932917

[51] Int. Cl.$^6$ ................ H04J 3/16; H04J 3/24
[52] U.S. Cl. ................ 370/337; 370/442; 370/522
[58] Field of Search ................ 370/328, 329, 370/336, 337, 345, 347, 442, 458, 498, 338, 522; 379/59, 63; 455/33.1, 56.1

[56] References Cited

U.S. PATENT DOCUMENTS

| | | | |
|---|---|---|---|
| 4,686,671 | 8/1987 | Burian et al. | 370/336 |
| 4,754,453 | 6/1988 | Eizenhofer | 370/337 |
| 4,928,274 | 5/1990 | Gilhousen et al. | 370/326 |
| 4,942,570 | 7/1990 | Kotzin et al. | 370/263 |
| 5,029,163 | 7/1991 | Chao et al. | 370/458 |
| 5,420,851 | 5/1995 | Seshadri et al. | 370/329 |

FOREIGN PATENT DOCUMENTS

| | | |
|---|---|---|
| 0 428 407 | 5/1991 | European Pat. Off. |
| 0 483 788 | 5/1992 | European Pat. Off. |
| 2 126 846A | 3/1984 | United Kingdom. |

OTHER PUBLICATIONS

ETSI/TC GSM, ETSI/PT12, Apr. 1990 Network Management Procedures and Messages on the A–BIS Interface, pp. 1–83.

ETSI–GSM, Technical Specification, GSM 08.54, Version 3.0.1., UDC:621.396.21, BSC–BTS Layer 1 Structure of Physical Circuits, 5 pages.

Primary Examiner—Hassan Kizou
Attorney, Agent, or Firm—Cushman Darby & Cushman Intellectual Property Group of Pillsbury Madison & Sutro LLP

[57] ABSTRACT

A data transmission method in a cellular radio system, comprising as network elements a base station controller and base stations connected in series thereto via data transmission links. Data is transmitted over the data transmission links in frames divided in time slots. To control the data transmission network formed by the data transmission links, configuration data indicating in which time slots of the frames the useful data intended for the network elements is carried is transmitted to the network elements in a predetermined time slot of the frames.

14 Claims, 5 Drawing Sheets

| | |
|---|---|
| LINK MANAGEMENT 301 | |
| UNUSED 401 | |
| BTS 2 CALLS 303 | |
| BTS 3 CALLS 304 | FIG. 4 |
| UNUSED 305 | |
| BTS 3 CONFIGURATION+O&M 306 | |
| UNUSED 402 | |
| BTS 2 CONFIGURATION+O&M 403 | |

| BTS No | CHANNELS USED |
|---|---|
| BTS 1 | 5 CHANNELS |
| BTS 2 | 2 CHANNELS |
| BTS 3 | 1 CHANNEL |

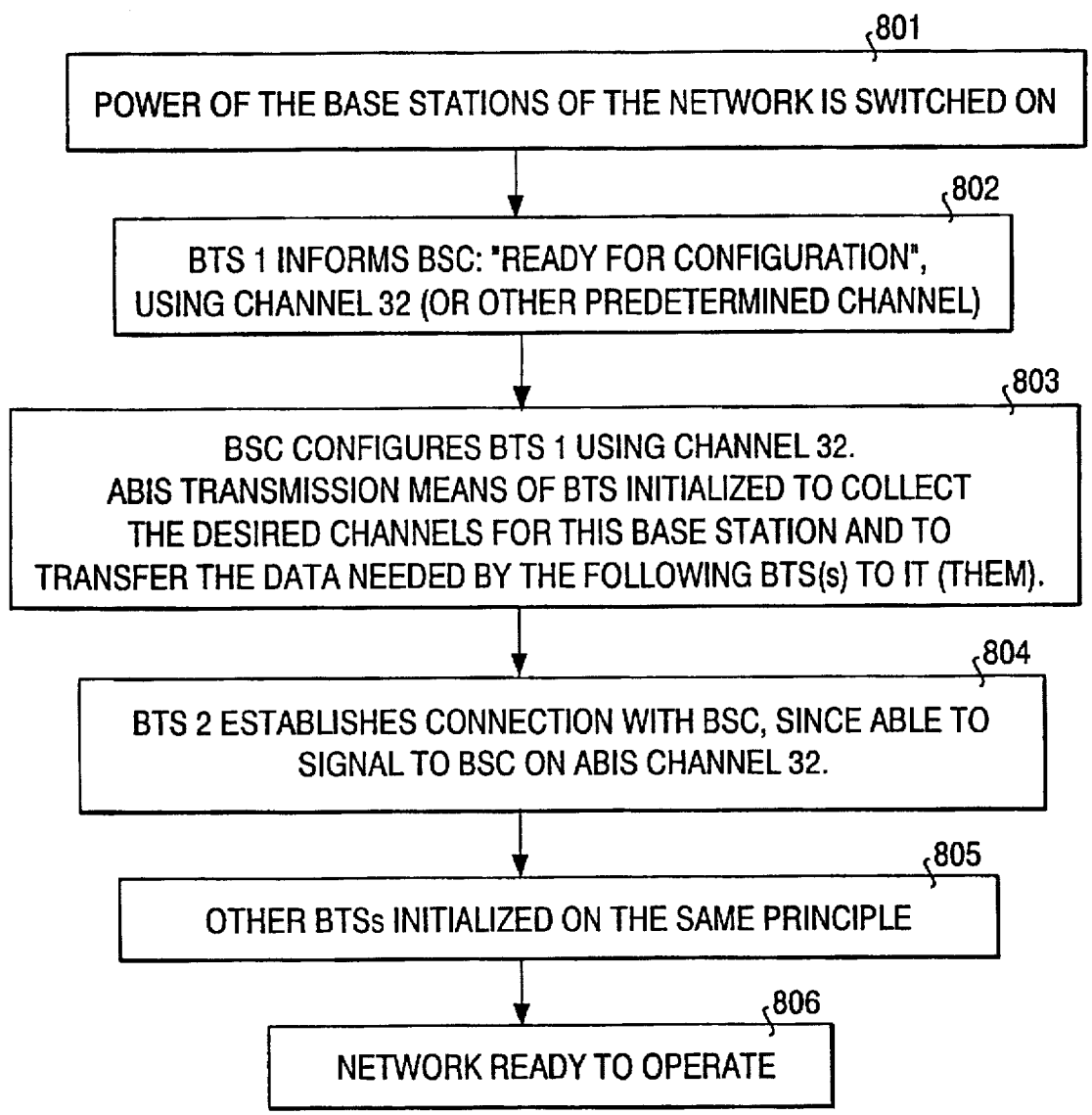

DATA TRANSMISSION FROM A CONTROLLER TO SUCCESSIVE BASES STATIONS LINKED IN SERIES

This application claims benefit of international application PCT/FI94/00268 filed Jun. 16, 1994.

FIELD OF THE INVENTION

The invention relates to a data transmission method and a data transmission system in a cellular radio system, comprising as network elements a base station controller and base stations connected in series thereto via data transmission links; in the method, data is transmitted over the data transmission links in frames divided into timeslots.

BACKGROUND OF THE INVENTION

In cellular radio systems, it is known to connect a plurality of base stations in series with one another by means of data transmission links in such a way that a plurality of base stations are controlled by one base station controller. The base station controller transmits data to each base station through other base stations in a certain predetermined timeslot of the data transmission link. These timeslots are fixed, i.e. the incoming and outgoing traffic of a base station are always carried in the same timeslot/timeslots. FIG. 1 shows a block diagram in which a Base Transceiver Station BTS 1 is connected to a Base Station Controller BSC. FIG. 2 shows base stations BTS 1, BTS 2 and BTS 3 connected in series in such a way that they communicate with the base station controller BSC through one another. An example for data transmission links used for carrying traffic between the base stations of a cellular radio network is a so-called Abis interface described in the GSM recommendations "GSM 12.21, 1992, Network Management Procedures and Messages on the Abis Interface, ETSI" and "GSM 08.54, 1992, BSC-BTS-Layer 1 Specification, ETSI". The Abis interface is divided into timeslots in the manner shown in FIG. 9. The interface may have, e.g., 32 timeslots of 64 kbit/s. When it has been necessary to change, e.g. increase, the amount of data transmitted to the base station, it has been possible to allocate a plurality of timeslots of a data transmission link to a specified base station. This has been implemented such that the base station controller has started to transmit data to each base station in a new timeslot and the base stations have been moved to receive incoming data from the correct timeslots. Typically, the base stations have been moved to receive data transmitted in the correct timeslots by manually modifying the configuration data of the data transmission link in the files of each base station.

In the above solution of the prior art, the number of data transmission links between the base stations of the network, i.e. the configuration of the network, can be modified only manually in such a way that the maintenance personnel checks on all the base stations to be modified and allocates the timeslots needed by means of the operation and maintenance unit of each base station. This is laborious, and if one data transmission link of a network formed by a plurality of base stations is allocated wrong, it may be necessary to re-configure the entire system. In this kind of prior art system, it is impossible to flexibly modify the network structure, i.e. the transmission capacity allocated for connections between different base stations and base station controllers or switching centers. It is thus impossible to modify the transmission capacity of the different base stations e.g. daily, depending on, for example, which base station has the heaviest traffic load. This kind of characteristic would be very useful for mobile phone operators in urban and suburban areas. When a system is used in which transmission capacity can be flexibly allocated to different base stations, the operators are not charged for the maximum transmission capacity between the base stations and the base station controller or switching center, since it is possible to allocate transmission capacity for each connection in the amount needed. Another drawback of the prior art system is that due to manual configuration of the transmission links of the network, it is difficult to manage the network described in the prior art since the network cannot be managed from one point but each base station must be checked on separately when the configuration of the network is to be modified. Further, it is difficult for the system described in the prior art to recover from a fault since a faulty timeslot cannot be flexibly replaced by another timeslot and since a faulty connection, e.g. in a ring-formed base station network, cannot be replaced by establishing another transmission link to the base station from the other direction of the ring.

SUMMARY OF THE INVENTION

The object of the present invention is to provide a data transmission method and system by which the above described problems of the prior art can be avoided. The object of the invention is also to enable flexible allocation of data transmission links between the base stations of the cellular radio network in such a way that the timeslots of the data transmission links can be flexibly allocated to different base stations. The object of the invention is thus to automate and facilitate the setting up or configuration of the structure of the data transmission network between the base station and the base station controller or switching center.

This new kind of data transmission method is achieved with the method of the invention, which is characterized in that configuration data indicating in which timeslots of the frame the useful data intended for the network element is carried is transmitted to the network element in a predetermined timeslot of the frame.

Further, the data transmission system according to the invention is characterized in that configuration data indicating in which timeslots of the frame the useful data intended for the network element is carried is transmitted to the network element in a predetermined timeslot of the frame.

The basic idea of the invention is that a certain channel, typically a timeslot, is assigned for network management. The configuration data, i.e. the data by means of which the base stations find the data channels, typically voice channels, allocated to them are transmitted to the base stations on this network management channel. Another basic idea of the invention is that all the base stations look for configuration data intended for them in the same predetermined timeslot, and in the base station network a preceding base station places the configuration data intended for the following base station in that same predetermined timeslot. This predetermined timeslot may be the last timeslot of the frame on a data transmission link, whereby the data stream passing through the base station is redivided such that the base station that is logically the following base station in the network finds the control data intended for it in the last timeslot intended for it.

The advantage of a data transmission method and system according to the present invention is that according to the method and system of the invention, the structure of the base station network, i.e. the number of the transmission lines allocated to each base station and their location over the transmission link, can be changed quickly and without any difficulties. This can be performed when considered necessary, and especially when the loading of the base stations varies and the number of the transmission links allocated to them is to be changed.

Another advantage of the invention is that a base station is quicker and easier to install in the network since the person installing the base station need not program the base station on the spot as part of the network but the system automatically connects the base station to the network.

Also, since the network can be managed and the configuration of the transmission links between the base stations modified by the base station controller or switching center in a centralized manner, the work of the person installing the base station is essentially facilitated. The installer of the base station need not be familiar with the structure of the whole base station network. Also, the method and system according to the invention reduce occurrence of faults and malfunctions in the base station network.

An advantage of the invention is that the structure of the base station is easier to control. The data about the structure of the base station can thereby be displayed on the base station controller and the configuration of the network can be easily changed from one point in the network.

Another advantage of the method and system according to the invention is that certain failures occurring in the network can be quickly and reliably overcome by the automatization and concentration of the network management according to the invention. For example, if the configuration data is always placed in the same predetermined timeslot, a base station in the network can always easily detect the configuration data intended for it in the same timeslot. If a link in a ring-formed network is disconnected, the configuration data of the network can then be transmitted to the opposite direction in the network, and thus the base station network can be re-configured and it starts to operate again despite the disconnection of the link.

Another advantage of the invention is that a base station network operating in accordance with the invention needs less transmission capacity for allocation of data channels, such as voice channels, between the base stations and the base station controller or switching center.

BRIEF DESCRIPTION OF THE DRAWINGS

In the following, the invention will be described in greater detail with reference to the attached drawings, wherein FIG. 4 shows a schematic view of a data transmission frame of the invention over a data transmission link between a first and second base station, FIG. 7 shows a schematic view of cross-connection of timeslots, FIG. 8 shows as a flow diagram how the configuration of a data transmission network according to the invention is modified.

DETAILED DESCRIPTION OF PREFERRED EMBODIMENTS OF THE INVENTION

Figure 1:
FIG. 1 shows a block diagram of a base station controller and a base station connected thereto via a data transmission link.
Figure 2:
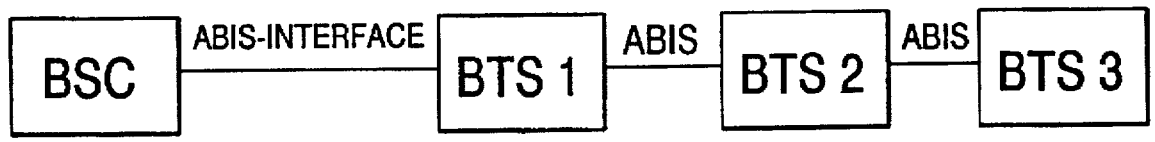
FIG. 2 shows a block diagram of a base station controller and of base stations connected in series thereto via a data transmission link.

FIGS. 1 and 2 are described above at the beginning of the specification.

Figure 3:
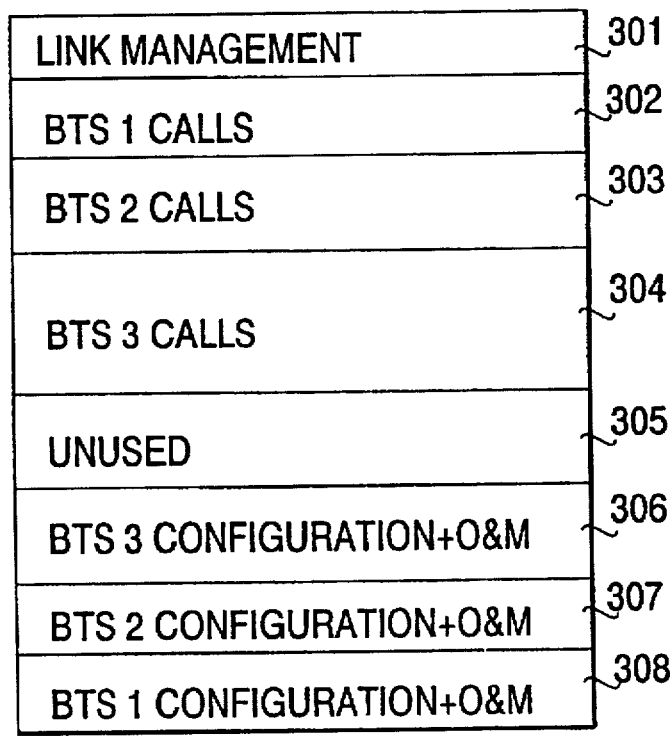
FIG. 3 shows a schematic view of a data transmission frame of the invention over a data transmission link between a base station controller and a first base station.

FIG. 3 shows a frame structure of a data transmission link between a base station controller and a first base station. In the frame shown in FIG. 3, the link managing information is placed, e.g., in a first timeslot 301. The following timeslots contain first the calls or other data 302 intended for the first base station BTS 1. The following timeslots contain the useful data, such as calls, intended for the second 303 base station BTS 2 and the third 304 base station BTS 3. The following field 305 is not in use, and the field 306 contains the configuration data used by the third base station BTS 3; on the basis of this data the third base station detects the useful data intended for it, placed in the field 304. The field 307 contains the configuration data intended for the second base station BTS 2, by which the second base station BTS 2 detects the useful data intended for it, placed in the field 303. Further, the field 308 contains the configuration data intended for the following base station, i.e. the first base station BTS 1; by this data the first base station detects the useful data 302, such as a voice channel, intended for it. The configuration data intended for the following base station is always placed in this last timeslot or field 308. Naturally, some other field or timeslot of the frame could also be assigned as the unchangeable predetermined field. It is also possible to modify the structure of the entire data transmission frame between the base stations dynamically such that all data contained in the data transmission frame is placed in a new position in the frame at each base station. Further, it is also possible to mark with an identifier the timeslot or field in which the configuration data to be transmitted is placed. It is then sufficient to transmit these identifiers to the following base station, and the following base station is able to detect the configuration data intended for it in the frame transmitted and to use the data for searching and detecting the data, e.g. voice channels, intended for it.

FIG. 4 shows a schematic view of a data transmission frame of the invention over a data transmission link between the first BTS 1 and second BTS 2 base station. The fields 301, 303, 304, 305 and 306 of the frame to be transmitted are the same as those of the data transmission link described above, i.e. they correspond to the fields of FIG. 3. A new feature as compared with the above data transmission link is that the calls (or other data) transmitted to the first base station BTS 1 have been removed from the field 401 (which replaces 302 of FIG. 3), and the field 401 is thus not in use. Naturally, something else could have been placed therein. The most significant change in regard to the above identified transmission link is that the field 403 (which replaces 308 of FIG. 3) does not contain the configuration data transmitted to the base station 1 but that the base station 1 BTS 1 has placed therein the configuration data intended for the base station 2 BTS 2. Further, the field 402 (which replaces 307 of FIG. 6) in which the configuration data intended for the second base station BTS 2 was placed on the first transmission link. The field 402 is not in use, or some other data may have been placed therein. The basic idea of the invention is that the first base station collects the configuration data intended for it from a predetermined field or timeslot and disposes the configuration data needed by the following or second base station in that same field, the configuration data informing the base station in which part of the frame the useful data, such as a voice channel, intended for it is located.

Figures 5, 6:
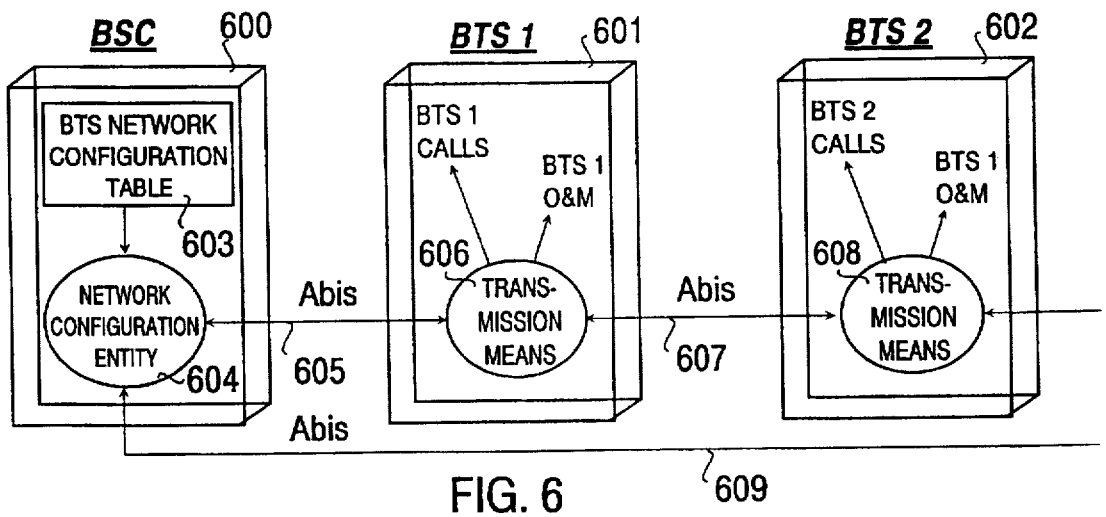
FIG. 5 shows a schematic view of allocation of data transmission channels to different base stations.
FIG. 6 shows a block diagram and a functional diagram of a data transmission system and method according to the invention.

FIG. 5 shows a database of a base station controller BSC or possibly of a switching center of a cellular radio system. In this database the user has defined the call capacity intended for each base station. A network configuration entity (shown in FIG. 6) located in the base station controller BSC transmits to each base station transmission means that contacts it the configuration data needed by that particular base station. On the basis of the configuration data, the base station concerned detects the call or other data intended for it in the frame structure of the Abis interface. The table shows it to the configuration entity of the base station controller how much transmission capacity it must allocate for traffic between itself and each base station.

FIG. 6 shows the elements needed in automatic configuration of a base station network. According to the invention, when the current is switched on in base stations BTS 1 601 and BTS 2 602, the base stations try to establish a connection with the base station controller BSC 600 through the Abis network. At first, only the first base station BTS 1 manages to establish a connection since it uses a predetermined channel. The predetermined channel may be, e.g., the last channel of the frame. In the base station controller, transmission of configuration data to the base stations is controlled by a network configuration entity 604. The base station controller BSC responds to the first base station on this channel. The other base stations are not able to establish a connection since BTS 1 is not yet ready to pass data to them. The base station controller BSC transmits to BTS 1 the configuration data intended for it, the configuration data comprising the list of Abis timeslots intended for the first base station and data for other base stations about cross-connection of timeslots intended to be performed by that particular base station. The table 603, which contains this data, is, e.g., of the type described in FIG. 7. It is seen therefrom that the second base station BTS 2 receives the configuration data it needs in a timeslot 32 allocated to it for operation and maintenance O&M signalling, and is thereby able to establish a connection with the base station controller BSC 600. The cross-connection can be performed in either direction: for BSC→BTS connection, 31 is connected to the channel 32, and for BTS→BSC, vice versa. The corresponding configuration data including the cross-connection table is then transmitted to the second base station BTS 2. The last BTS of the network does not need cross-connection data: when base stations are connected in series, the last base station is (logically) not followed by a base station that would require cross-connection. Further, the cross-connection may be a free cross-connection, which means that any timeslot can be transferred to any other timeslot when the data stream passes through the transmission means.

Transmission means 606, 608 is the unit of the base station 601, 602 that allocates Abis channels (timeslots) to the base station and performs the desired cross-connection of the data stream passing through the base station to the other base stations. Transmission means of this kind are already available.

FIG. 6 also shows that calls and operation and maintenance data O&M are passed through the transmission means 606 to the first base station BTS 1 601. The corresponding data is transmitted to the second base station BTS 2.

The base stations of a cellular radio network can be connected such that they form a ring, to ensure that the connection between the base station controller BSC and the base stations BTS is maintained although the connection from one direction fails. Data can then be transmitted by using the other connection of the base station ring. In FIG. 6, the connection of the base stations such that they form a ring is indicated by reference number 609. Whether or not the connection between the base stations and the base station controller is maintained depends on where the base station ring breaks.

FIG. 8 shows a flow diagram for the configuration of the base station network. In the first step, the current of the base stations of the network is switched on 801. Then the first base station BTS 1 informs 802 the base station controller BSC that it is ready for configuration. The first base station performs the configuration by using the channel 32, i.e. the last channel of the frame or an otherwise fixed channel. The base station controller BSC then configures 803 the first base station BTS 1 by using the channel 32. The Abis transmission means of the base station BTS 1 is then initialized to collect the desired channels from the desired timeslot for the first base station, and to transfer to the following base station or base stations the channels needed by them. Being able to signal with the base station controller BSC on the A-bis channel 32, the base station BTS then establishes a connection 804 with the base station controller BSC. The other base stations BTS are then initialized 805 on the same principle, and after this the base station network is ready 806 to operate. If the configuration of the network is to be modified when the network is already in operation, this can be performed on the above principle, starting with the base station whose voice channel number is to be changed.

Figure 9:
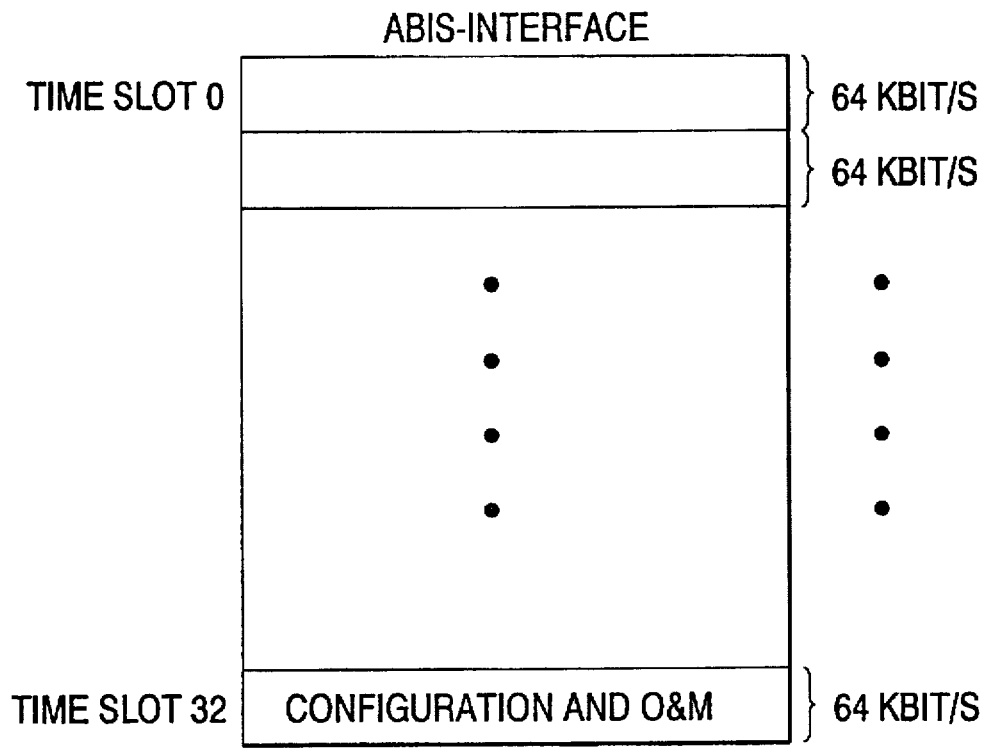
FIG. 9 shows a schematic view of the frame structure of an Abis interface.

FIG. 9 shows a schematic view of a frame structure of an Abis interface. The transmission rate of the Abis interface is e.g. 2 Mbit/s, divided into 32 timeslots of 64 kbit/s. In the solution of the invention, the transmittable network configuration data is placed in a predetermined timeslot, such as here the last timeslot, which is used for transmitting operation and maintenance data to the base stations.

Figure 10:
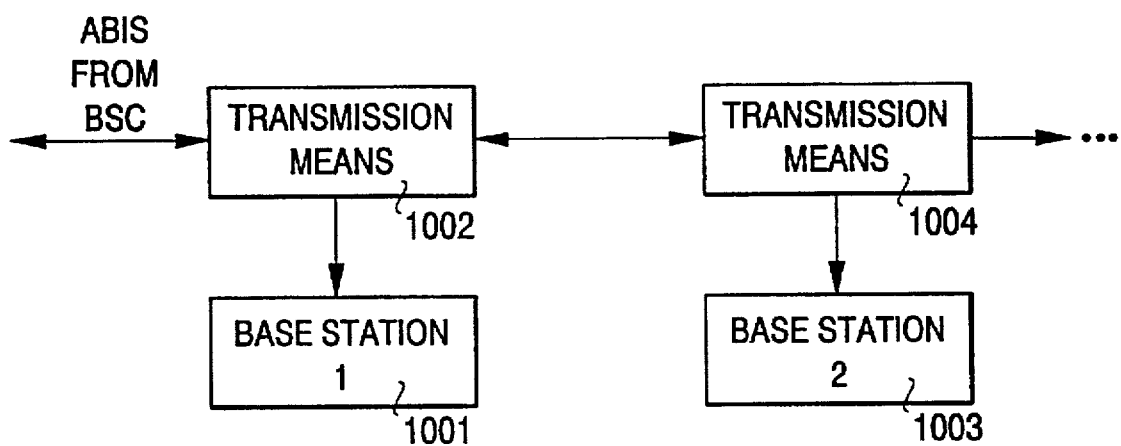
FIG. 10 shows a schematic view of a base station network to which the base stations are connected via their transmission means.

FIG. 10 shows a schematic view of a base station network to which base stations 1001 and 1003 are connected by their transmission means 1002 and 1004. If necessary, the transmission means reorganizes the 64 kbit/s timeslots located in the 2 Mbit/s frame of the Abis interface. This takes place as the frame "passes" through the transmission means. The order in which the base station puts the timeslots that have passed through it is determined by configuration, i.e. by giving the necessary configuration data to the transmission means, e.g. on the operation and maintenance channel of the transmission link.

Figure 11:
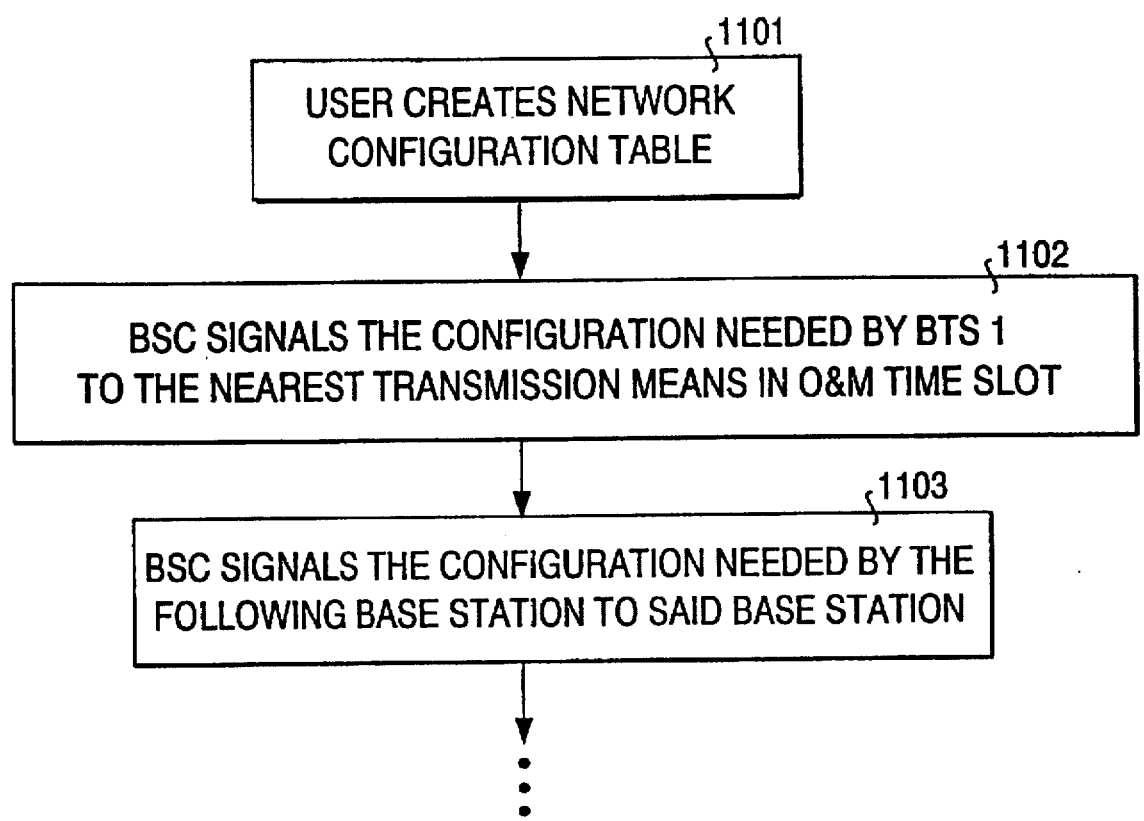
FIG. 11 shows a flow diagram of the configuration of a base station network.

FIG. 11 shows a flow diagram of the configuration of a base station network. In step 1101, the network user designs a configuration table for the network. The base station controller BSC then transmits 1102 the configuration data needed by the nearest base station to the transmission means of that base station in a predetermined timeslot, e.g. in the timeslot allocated for operation and maintenance. The first base station then operates in a way as a repeater and transmits to the following base station the configuration data transmitted by the base station controller. In other words, the base station controller BSC transmits 1103 the configuration data needed by the following base station to said base station.

The drawings and the description thereof are to be understood only as illustrating the idea of the invention. The data transmission method and system of the invention may vary in their details within the scope of the claims. Although the invention is described above mainly as applied to a GSM system, it may also be used in other cellular radio systems. With regard to the modifications of the invention, it should especially be noted that any timeslot can be permanently assigned as the timeslot used for transmission of configuration data. In the present example, this timeslot is the last timeslot available, but it may also be any other timeslot and even vary from one base station to another, as long as each base station receives information indicating where the configuration data intended for it is located. However, in the beginning the timeslot must be fixed; otherwise it would not even be possible to send network configuration commands to a base station and the base station would not be able to receive them.

In one alternative embodiment of the invention, the base station BTS can also configure the Abis interface or transmission means without the help of the base station controller BSC. The automatization degree of the invention can thus be raised at the base stations. Each base station then makes a certain initial setting, which the base station controller BSC can later modify base station-specifically, if necessary.

I claim:

1. A data transmission method in a cellular radio system comprising as network elements a base station controller and a plurality of base stations connected in series to said base station controller via a succession of data transmission links, said method comprising the steps of:
    (a) transmitting data in a direction over said links, in a succession of frames each divided into a regular succession of a given number of timeslots, so that, in reference to said direction one of said network elements is a first one of said network elements, and a next one of said network elements is a second one of said network elements;
    (b) as one part of said transmitting, transmitting in said direction configuration data intended for said first one of said network elements in a predetermined timeslot of said frames;
    (c) as another part of said transmitting, transmitting in said direction configuration data intended for said second one of said network elements to said first one of said network elements in another timeslot of said frames; and
    (d) as yet another part of said transmitting, transmitting in said direction said configuration data intended for said second one of said network elements from said first to said second network element in said predetermined timeslot of said frames.

2. The data transmission method of claim 1, further comprising:
    respectively collecting in said first and second network elements useful data respectively intended for said first and second network elements from respective different ones of said timeslots of said frames, on the basis of said configuration data as respectively received by said first and second network elements in said predetermined timeslot.

3. The method of claim 2, wherein:
    said predetermined timeslot is a last timeslot of respective ones of said frames.

4. The method of claim 1, further comprising:
    as part of said transmitting including configuration data for said network elements in an operation and maintenance channel so that information for controlling said first and second network elements is respectively received by said first and second network elements in said predetermined timeslot.

5. The method of claim 4, further comprising:
    as part of said transmitting including configuration data for said network elements in an operation and maintenance channel so that information for controlling said first and second network elements is respectively received by said first and second network elements in said predetermined timeslot.

6. The method of claim 1, wherein:
    said predetermined timeslot is a last timeslot of respective ones of said frames.

7. The method of claim 1, further including:
    said first network element receiving data transmitted thereto as a result of practicing of step (a), including said configuration data of step (b) intended for said first network element and said configuration data of step (c) intended for said second network element, and transferring said configuration data intended for said second network element from said other timeslot to said predetermined timeslot and then performing step (d).

8. A data transmission method in a cellular radio system comprising as network elements a base station controller and a plurality of base stations connected in series to said base station controller via a succession of data transmission links, said method comprising the steps of:
    (a) transmitting data in a direction over said links, in a succession of frames each divided into a regular succession of a given number of timeslots, so that, in reference to said direction one of said network elements is a first one of said network elements, and a next one of said network elements is a second one of said network elements;
    (b) as one part of said transmitting, transmitting in said direction configuration data intended for said first one of said network elements in a selected timeslot of said frames, together with an identifier identifying for said first network element which of said timeslots contains said configuration data intended for said first one of said network elements;
    (c) as another part of said transmitting, transmitting in said direction configuration data intended for said second one of said network elements to said first one of said network elements in another timeslot of said frames; and
    (d) said first network element receiving data transmitted thereto as a result of practicing of step (a), including said configuration data of step (b) intended for said first network element and said configuration data of step(c) intended for said second network element.

9. A data transmission method in a cellular radio system comprising as network elements a base station controller and a plurality of base stations connected in series to said base station controller via a succession of data transmission links, said method comprising the steps of:
    (a) transmitting data in a direction over said links, in a succession of frames each divided into a regular succession of a given number of timeslots, so that, in reference to said direction one of said network elements is a first one of said network elements, and a next one of said network elements is a second one of said network elements;
    (d) as part of said transmitting including configuration data for said network elements in an operation and maintenance channel so that information for controlling said first and second network elements is respectively received by said first and second network elements in said predetermined timeslot; and (e) as yet another part of said transmitting, transmitting in said direction said configuration data intended for said second one of said network elements from said first network element to said second network element together with an identifier identifying for said second network element which of said timeslots contains said configuration data intended for said second network element.

10. A data transmission method in a cellular radio system comprising as network elements a base station controller and a plurality of base stations connected in series to said base station controller via a succession of data transmission links, said method comprising the steps of:

(a) transmitting data in a direction over said links, in a succession of frames each divided into a regular succession of a given number of timeslots, so that, in reference to said direction one of said network elements is a first one of said network elements, a next one of said network elements is a second one of said network elements, and a further next one of said network elements is a third one of said network elements;

(b) as one part of said transmitting, transmitting in said direction configuration data intended for said first one of said network elements in a predetermined timeslot of said frames;

(c) as another part of said transmitting, transmitting in said direction configuration data intended for said second one of said network elements to said first one of said network elements in another timeslot of said frames:

(d) as yet another part of said transmitting, transmitting in said direction configuration data intended for a third one of said network elements to said first one of said network elements in yet another timeslot of said frames;

(e) said first network element receiving data transmitted thereto as a result of practicing of step (a), including said configuration data of step (b) intended for said first network element and said configuration data of step (c) intended for said second network elements, and transferring said configuration data intended for said second network element from said other timeslot to said predetermined timeslot;

(f) as a first further part of said transmitting, transmitting in said direction said configuration data intended for said second one of said network elements from said first network element to said second network element in said predetermined timeslot of said frames;

(g) said second network element receiving network element receiving data transmitted thereto as a result of practicing of step (a), including said configuration data of step (c) intended for said second network element and said configuration data of step (d) intended for said third network element and transferring said configuration data intended for said third network element from said yet other timeslot to said predetermined timeslot; and (h) as a second further part of said transmitting, transmitting in said direction said configuration data intended for said third one of said network elements from said second network element to said third network element in said predetermined timeslot of said frames.

11. A cellular radio data transmission system comprising:

network elements including a base station controller and a plurality of base stations connected in series to said base station controller via a succession of data transmission links;

means for transmitting data in a direction over said links, in a succession of frames each divided into a regular succession of a given number of timeslots, so that, in reference to said direction one of said network elements is a first one of said network elements, and a next one of said network elements is a second one of said network elements, including:

transmitting, transmitting in said direction configuration data intended for said first one of said network elements in a predetermined timeslot of said frames;

transmitting, transmitting in said direction configuration data intended for said second one of said network elements to said first one of said network elements in another timeslot of said frames; and transmitting, transmitting in said direction said configuration data intended for said second one of said network elements from said first network element to said second network element in said predetermined timeslot of said frames.

12. The system of claim 11, wherein:

said means for transmitting data further includes means for providing an operation and control channel for operating and controlling said base stations; and said means for transmitting data is arranged to transmit said configuration data on said operation and control channel.

13. The system of claim 12, wherein:

said predetermined timeslot is the last timeslot of said frames.

14. The system of claim 11, wherein:

said predetermined timeslot is the last timeslot of said frames.

* * * * *